April 1, 1958  E. P. MARKOWSKI  2,828,934
VIBRATION ISOLATOR

Filed Feb. 9, 1955  2 Sheets-Sheet 1

Inventor,
Edwin P. Markowski,
by Robert L. Thompson
Att'y.

April 1, 1958  E. P. MARKOWSKI  2,828,934
VIBRATION ISOLATOR

Filed Feb. 9, 1955  2 Sheets-Sheet 2

Inventor,
Edwin P. Markowski,
by Robert L. Thompson
Att'y.

United States Patent Office 2,828,934
Patented Apr. 1, 1958

2,828,934

VIBRATION ISOLATOR

Edwin P. Markowski, Dorchester, Mass., assignor to Barry Controls Incorporated, Watertown, Mass., a corporation of Massachusetts Application February 9, 1955, Serial No. 487,165

8 Claims. (Cl. 248—358)

This invention relates to resilient supports and, more particularly, to vibration isolators. A vibration isolator is a device to reduce the magnitude of vibration as it is transmitted from one structure to another. The vibration whose magnitude is reduced may be either a vibratory motion or a vibratory force. Vibration isolators are commonly used to support engines, pumps and the like to prevent the transmission of force from such equipment to the structure which supports it. Vibration isolators are also used to mount delicate equipment in aircraft, vehicles, ships, industrial plants and the like to protect such equipment from the vibratory motion existing where the equipment is required to be used.

The principal elements of a vibration isolator are resilient means for supporting the load and damping means for dissipating energy to prevent the vibration amplitude from becoming excessively great. It is difficult to combine both of these functions in a single mechanical element. In certain types of vibration isolator it is convenient to employ a coil spring for supporting the load. The stiffness of such a spring may be carefully controlled and predetermined to accomplish the desired function. Such a spring generally is undamped and separate energy dissipating means must be used in conjunction with the coil spring to attain optimum characteristics for the vibration isolator.

One of the most important applications for vibration isolators is in the protection of electronic equipment. Recent technological advances in the design of such equipment have introduced a continuing trend toward smaller and lighter equipment. Consequently, isolators used with such equipment must also be smaller and must be designed for supporting lighter loads. It is an object of this invention to provide a vibration isolator capable of adequately supporting equipment of very light weight. It is a further object to provide such an isolator which may be made entirely from metal so that no adverse effects will result from use in unfavorable environments, such as very low temperatures that exist in military aircraft and other places of use.

It is old in the art to construct isolators entirely of metal. An example of an isolator embodying such type of construction may be found in U. S. Patent No. 2,680,284. The dampers in such all metal isolators are formed from wire and are incorporated in the isolators in such a way that the vibration of the isolator causes the damper to experience cycles of increasing and decreasing length during which the friction of one strand rubbing against another dissipates energy and provides the damping means for the isolator. A damper which operates on this principle is not practical for use in isolators intended to support very light loads because the stiffness of the damper is too great. It is another object of this invention to provide an all metal damper which is so constructed that the damper is not compressed or extended axially as the isolator experiences vibration. The metal damper is arranged to remain stationary in the spring and in the load attachment member when they vibrate, the friction generated between the sides of the damper and such members functioning to subtract energy from the system and thereby to provide the desired damping action.

Other objects and advantages of the invention will become apparent from the following detailed description and accompanying drawings in which.

Figure 1:
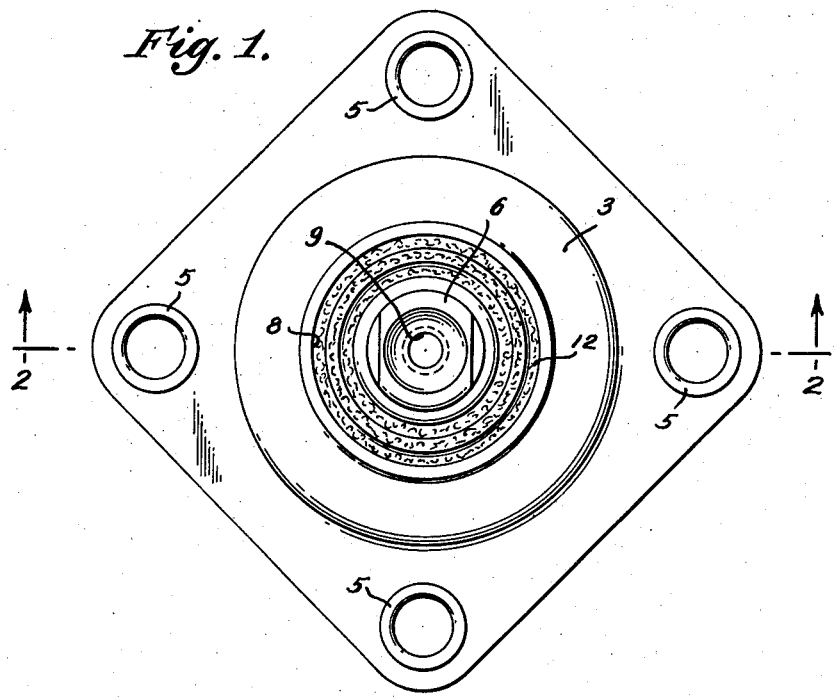
Fig. 1 is a top plan view of a preferred embodiment of the invention.
Figure 2:
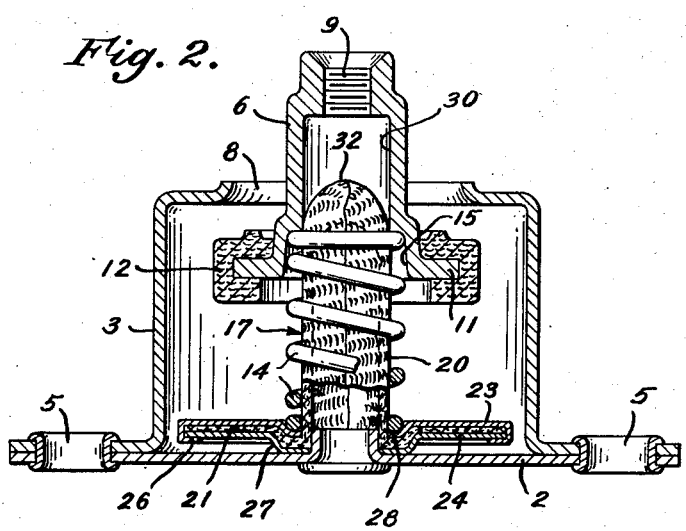
Fig. 2 is a section on the line 2—2 of Fig. 1, the lower portion of the coil spring and damper being shown in section.

In the embodiment of the invention illustrated in Figs. 1 and 2, the resilient support or isolator includes a housing comprised of a base member 2 and an inverted cup 3. The base member and cup are secured together by hollow eyelets 5, the isolator being adapted for mounting to a structure by inserting screws, bolts or rivets (not shown) through the hollow eyelets 5. The load attachment member 6 in the embodiment shown extends through an opening 8 in the top wall of the inverted cup 3 and is provided with a tapped hole 9 for ready attachment of the supported load.

The lower end of the load attachment member 6 is formed with an outwardly extending peripheral flange 11 which is encased within a resilient snubber 12 preferably formed by compressing a knitted wire covering onto the flange. This knitted wire snubber engages the inner and top walls of the inverted cup 3 to limit lateral and upward motion of the supported load.

The resilient load-carrying element is a coil spring 14, the upper end of which nests within a counterbore 15 on the lower face of the load attachment member 6. A damper assembly generally indicated by the numeral 17 described in detail in the following paragraph extends upwardly from adjacent the load attachment member 6.

Figure 3:
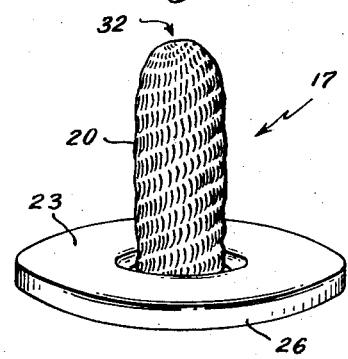
Fig. 3 is a perspective view of the damper assembly used in the isolator illustrated in Figs. 1 and 2.

The damper assembly 17, which extends upwardly through the coil spring as shown in Fig. 2, is illustrated in perspective in Fig. 3. It is comprised of a knitted wire sleeve or sock 20 whose lower ends 21 are turned laterally outward and clamped between an upper washer 23 and a lower washer 24. The two washers are secured together firmly by swaging inwardly the depending flange of the upper washer 23 at 26 so that it extends beneath the lower washer 24 as shown in Fig. 2. The lower washer 24 is formed with a central depressed portion 27 which rests upon the base member 2. The coil spring 14 which forms the resilient load-carrying means rests upon a depressed central portion 28 of the upper washer 23. The damper sleeve 20 is formed of flexible knitted wire and is flexible in a lateral or transverse direction to permit the flexibility of the spring in a lateral direction to be realized for proper functioning of the isolator.

The load attachment member 6 is provided with a downwardly facing cavity 30 whose diameter is smaller than the outside diameter of the coil spring 14. The overall width or diameter of the sleeve 20 is somewhat greater than the inside diameter of the cavity 30. The sleeve is relatively pliable, however, and compresses laterally upon sliding into and out of the cavity 30 as vertical vibratory motion of the isolator occurs. The friction involved between the sleeve and the wall of the cavity in this sliding subtracts energy from the vibrating system, thereby providing the desired damping. Inasmuch as the lower end of the damper sleeve is fixed with respect to vertical motion and the upper end of the sleeve maintains a fixed vertical relation with respect to the lower end, the upper coils of the spring rub against the damper sleeve 20 and provide additional dissipation of energy. The rubbing of the damper sleeve 20 on the inner walls of the cavity 30 and on the upper coils of the spring 14 contribute energy dissipation and damping for the isolator.

The combination of the damper assembly 17, coil spring 14 and load attachment member 6 described above has a similarity in appearance to the spring and pilot construction illustrated in Turton United States Patent No. 998,814 but there is no functional similarity between these constructions because that shown in the Turton patent has no capacity for damping the isolator and it also lacks the horizontal compliance necessary to permit proper functioning of a vibration isolator. The damping sleeve 20 which is claimed as an element of this invention is compliant in a radial or transverse direction, thereby permitting the resilience necessary for vibration isolation. Furthermore, the sleeve 20 is compressible transversely and it exerts a damping force upon the wall of the cavity 30 in the load attachment member 6 at substantially all positions of the load attachment member.

Figure 4:
Fig. 4 is a plan view of a length of the knitted wire tube or sock used to form the wire portion of the damper assembly shown in Figs. 2 and 3.
Figure 5:
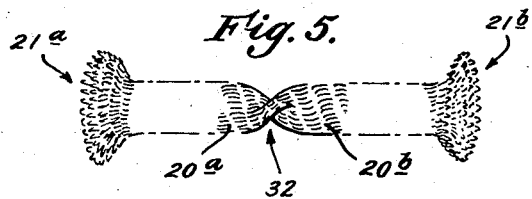
Fig. 5 is a plan view of the knitted sock shown in Fig. 4 after some of the operations of forming the damper have been completed.

The method of making the damper assembly illustrated in Figs. 2 and 3 may be further described with reference to Figs. 4 and 5. The material from which the damper is constructed is a tube or sock 31 of knitted stainless steel wire of predetermined length. As illustrated in Fig. 4, the sock has been flattened along a diameter and it is substantially flat in the plane of the drawing. The next step in forming the damper is to twist the flattened sock 31 180° at its longitudinal center as illustrated in Fig. 5, wherein opposite halves 20a and 20b remain in the plane of the paper as distinguished from the twisted central portion 32. One of the portions 20a or 20b has been reversed or twisted 180° with respect to its position shown in Fig. 4. The ends of the sock are then frayed outwardly as illustrated at 21a and 21b in Fig. 5, and the two portions 20a and 20b of the sock are then folded towards each other through an angle of 180° about the twisted central portion 32. In this position the twist 32 forms a pointed end, the portions 20a and 20b form the substantially tubular side wall or sleeve 20 and the frayed ends 21a and 21b form an outwardly extending flange at the base of the sleeve 20, as shown in Fig. 2.

The upper washer 23 is then slipped over the twisted end 32 of the folded sock so that the frayed ends 21a, 21b lie flatwise against the bottom of the washer 23. The next step is to apply the lower washer 24 so as to include the frayed ends 21 of the sock between the washers 23 and 24. The washers are then joined together by swaging the flange 26 on the upper washer 23 to provide the damper assembly 17 illustrated in Figs. 2 and 3. One purpose of the 180° twist described above is to provide a relatively pointed end, thereby facilitating the assembly of the upper washer 23 and the wire sleeve 20 during fabrication of the damper and also facilitating assembly of the wire sleeve 20 within the coil spring 14 as the isolator is assembled. The pointed end 32 also facilitates sliding of the sleeve 20 in the cavity 30 of the load attachment member 6.

The sleeve 20 may also be made denser by initially superimposing a second tube or sock of knitted wire upon the first tube 31 of Fig. 4 and then performing the twisting, fraying and folding step upon this double thickness sock. The resultant product is like the sleeve 20 but it has greater density.

Figure 6:
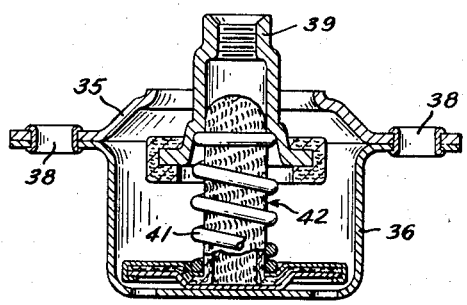
Fig. 6 is a vertical section similar to Fig. 2 showing another embodiment of the invention.

In the isolator illustrated in Fig. 6, the housing is comprised of an upper member 35 and a cup-type base member 36. These members are eyeletted together by hollow eyelets 38 as described with reference to Figs. 1 and 2. This embodiment of the isolator employs a load attachment member 39, a coil spring 41, and a damper assembly 42 similar to that heretofore described with reference to Figs. 2 and 3. It is intended for use in applications where space between the mounted equipment and the supporting structure is limited and where the cup-type base may be permitted to protrude through an opening in the supporting structure.

Figure 7:
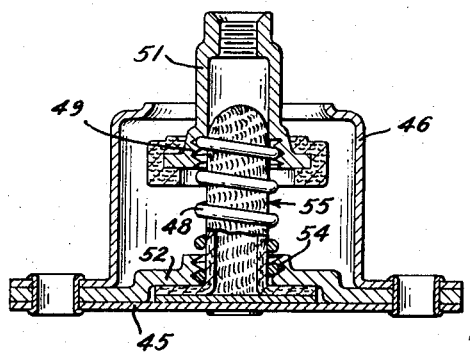
Fig. 7 is a vertical section similar to Fig. 2 showing another embodiment of the invention.

In the embodiment illustrated in Fig. 7, the housing consists of the base member 45 and inverted cup 46 of the type illustrated in Figs. 1 and 2. Whereas the embodiment of Figs. 1 and 2 is suitable only for applications in which the load acts downwardly on the isolator, the embodiment of Fig. 7 is suitable for use in either tension or compression because the coil spring 48 is arranged to take either a tension or a compression load. This is accomplished by providing a spiral groove 49 on the underside of the load attachment member 51 into which the upper end of the coil spring 48 is threaded. In a somewhat similar manner, a lower spring support 52 is provided with a spiral groove 54 at the center into which the lower end of the coil spring 48 is threaded. The lower end of the damper assembly 55 is disposed under the lower spring support 52, thereby captivating the lower ends of the damper assembly 55 and making it possible for the damper to function as described with reference to Figs. 1 and 2.

Figure 8:
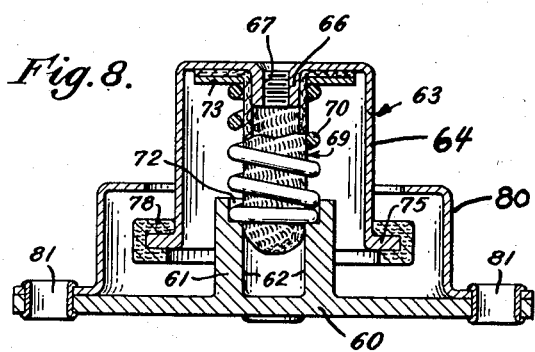
Fig. 8 is a vertical section similar to Fig. 2 showing a still further embodiment of the invention.

In the embodiment illustrated in Fig. 8, the base member 60 has formed integral therewith an upwardly projecting embossment 61 having a downwardly extending cavity 62 communicating with the upper face thereof. The load attachment member 63 is in the form of an inverted cup 64 having a downwardly projecting embossment 66 at its center and a tapped hole 67 for attachment of the supported load. The damper assembly 69 is similar to that illustrated with reference to Figs. 1 and 2, but is installed in the inverted position with the embossment 66 of the load attachment member 63 extending downwardly into the upper end of the damper assembly 69. The lower end of the damper assembly 69 extends into the cavity 62, and the movement of the damper sleeve within this cavity 62 subtracts energy from the system and provides damping for the isolator. The resilient load-carrying means is a coil spring 70 whose lower end is supported within a counterbore 72 on the upper face of the embossment 61. The upper end of the coil spring 70 rests against the upper end 73 of the damper assembly 69. The lower rim of the load attachment member 63 is formed with an outwardly extending peripheral flange 75 which is equipped with resilient wire snubbing means 78. The snubbing means is adapted to engage the inverted cup member 80 which is attached to the periphery of the base member 60 by the eyelets 81.

Although several preferred embodiments of the invention have been shown and described, various modifications thereof may be made without departing from the spirit or scope of the invention as defined by the following claims.

I claim:

1. A vibration isolator comprising a supporting member, a coil spring for resiliently supporting a load, said spring having an end mounted on said supporting member, a load attachment member mounted on the other end of said coil spring whereby said supporting member is adapted to resiliently support a load secured to said load attachment member, one of said supporting member and said load attachment member having a cavity in axial alignment with said spring, a damper comprising interlocked flexible wires located at least partially within said spring, said damper being resilient transversely of the spring, one end of said damper being free from attachment to said members and slidable in said cavity in said one of said members and the other end of said damper being held in fixed relation to the other of said members, whereby when the load attachment member is subjected to vibratory movement, the end of the damper which extends into said cavity damps such vibratory movement at least partially by frictional engagement with the wall of said cavity.

2. A vibration isolator according to claim 1 wherein said damper is comprised of a knitted tube of interlocked flexible wires having a fold at one end and two semi-cylindrical longitudinal sections of two plies of knitted fabric dependent therefrom.

3. A vibration isolator according to claim 1 wherein said damper is comprised of a knitted tube of interlocked flexible wires having a pointed end portion comprised of a twist of 180° and semi-cylindrical longitudinal sections dependent from said end portion.

4. A vibration isolator according to claim 2 the opposite end of said damper having radially extended flanges.

5. A vibration isolator comprising a supporting member, a coil spring for resiliently supporting a load, said spring having an end mounted on said supporting member, a load attachment member mounted on the other end of said coil spring whereby said supporting member is adapted to resiliently support a load secured to said load attachment member, one of said supporting member and said load attachment member having a cavity in axial alignment with said spring and of smaller diameter than the outside diameter of said spring, a damper comprising interlocked flexible wires located at least partially within said spring and frictionally engaging a plurality of the coils of said spring, said damper being resilient transversely of the spring, one end of said damper being slidable axially of and in frictional engagement with the wall of said cavity in said one of said members and the other end of said damper being held substantially in fixed relation to the other of said members, whereby when the load attachment member is subjected to vibratory movement, the end of the damper which extends into said cavity damps such vibratory movement at least partially by frictional engagement with the wall of said cavity and the portion of said damper which is located within said spring damps such vibratory movement at least partially by frictional engagement with a plurality of the coils of said spring.

6. A vibration isolator according to claim 5 wherein said damper is comprised of a knitted tube of interlocked flexible wires having a fold at one end and two semi-cylindrical longitudinal sections of two plies of knitted fabric dependent therefrom.

7. A vibration isolator according to claim 5 wherein said damper is comprised of a knitted tube of interlocked flexible wires having a pointed end portion comprised of a twist of 180° and semi-cylindrical longitudinal sections dependent from said end portion.

8. A vibration isolator according to claim 6 the opposite end of said damper having radially extended flanges.

References Cited in the file of this patent

UNITED STATES PATENTS

| | | |
|---|---|---|
| 998,814 | Turton | July 25, 1911 |
| 2,386,463 | Hile | Oct. 9, 1945 |
| 2,520,442 | Schwartz | Aug. 29, 1950 |
| 2,687,269 | Titus et al. | Aug. 24, 1954 |